United States Patent [19]

Parish

[11] Patent Number: 4,986,946

[45] Date of Patent: Jan. 22, 1991

[54] POLYIMIDE ARTICLES OF INTERMEDIATE ELECTRICAL CONDUCTIVITY AND A PROCESS FOR MAKING THEM

[75] Inventor: Darrell J. Parish, Circleville, Ohio

[73] Assignee: E. I. Du Pont de Nemours and Company, Wilmington, Del.

[21] Appl. No.: 322,621

[22] Filed: Mar. 13, 1989

Related U.S. Application Data

[62] Division of Ser. No. 212,963, Jun. 29, 1988, abandoned.

[51] Int. Cl.$^5$ .......................... C04B 35/00; H01B 1/00
[52] U.S. Cl. .................................... 264/104; 264/105; 264/331.11; 264/331.19; 264/347; 252/511; 252/512
[58] Field of Search ................ 252/511, 512; 524/495, 524/496; 264/105, 104, 204, 347, 331.11, 331.19

[56] References Cited

U.S. PATENT DOCUMENTS 4,702,859 10/1987 Shimuza et al. .................... 252/511

FOREIGN PATENT DOCUMENTS 708896 5/1965 Canada .

Primary Examiner—Josephine Barr

[57] ABSTRACT

A polymeric article having high temperature performance and intermediate electrical conductivity is disclosed. The article has a matrix of polyimide and a filler of conductive particulate material. The degree of conductivity is controlled by an extraction step in the manufacturing process.

6 Claims, No Drawings

POLYIMIDE ARTICLES OF INTERMEDIATE ELECTRICAL CONDUCTIVITY AND A PROCESS FOR MAKING THEM This application ia a division of application Ser. No. 07/212963 filed June 29, 1988.

BACKGROUND OF THE INVENTION

This invention relates to electrically conductive polyimide articles and to a process for making such articles. More specifically, the invention relates to polyimide articles of intermediate electrical conductivity which can be made by a manufacturing process utilizing a specific solvent extraction step.

Polyimide articles, such as films, are usually manufactured in a two-stage process. The first stage is a polycondensation reaction between a dianhydride and diamine in a suitable solvent. This polyamic acid solution is then fabricated into a shaped article, e.g., a film, by solvent casting and removal of the solvent. In the second stage, the resulting polyamic acid film is either converted chemically or thermally to the polyimide by the removal of two molecules to water. Solvent extraction from shaped articles of aromatic polyamide as a step in the conversion process has been disclosed in several references, including Japanese Patent Application No. 51-122167; U.S. Pat. Nos. 3,961,009; 4,346,215 and 4,470,944.

Canadian Pat. No. 708,896 discloses polyimide film materials manufactured to exhibit electrical conductivity by virtue of the addition to the film material of finely-divided electricallyconductive particles. The patent discloses conversion of polyamide acid to polyimide by a chemical process, involving batchwise soaking of polyamide acid film, on glass plates, in a bath of acetic anhydride and pyridine. The resulting polyimide films have relatively low electrical conductivity. Thermal conversion of polyamide to polyimide, on the other hand, results in a film material of relatively high electrical conductivity. The Canadian patent does not suggest means for controlling the degree of electrical conductivity except as such control might be expected by use of different concentrations of conductive particles.

It has now been found that polyimide articles having intermediate conductivities can be prepared by a manufacturing process using a solvent extraction step in the later stages. By intermediate conductivity it is meant that the conductivity of the polyimide article is intermediate to that of a corresponding article manufactured using a chemical conversion process as and that of a corresponding article manufactured using a thermal conversion process, as more fully described below. None of the known prior art suggests that extraction steps should or could be used in manufacturing electrically conductive polyimide articles. Polyimide articles of this invention having intermediate electrical conductivity may be suitable for use in electronics, copier belts, heating tape, electromagnetic interference shielding, and related applications.

SUMMARY OF THE INVENTION

The present invention provides an article having good high temperature performance characteristics and intermediate electrical conductivity comprising a matrix of aromatic polyimide and a filler of a finely-divided electrically conductive particulate material, wherein the particulate material is homogeneously distributed throughout the matrix and is present in an amount of about 10 to about 45 weight percent of the total article, and wherein the level of microscopic voids in the matrix polymer is such that the density of the polyimide matrix is from about 97% to about 99% of the matrix density obtained by preparation of the same polyimide from the precursor polyamic acid by a thermal conversion process.

DETAILED DESCRIPTION

To make the articles of this invention, an electrically conductive material is dispersed throughout a mixture, or "casting dope", of polyamic acid, polyamic acid conversion chemicals, and solvent for the polyamic acid. Polyamic acid can be made as disclosed in U.S. Pat. Nos. 3,179,630 and 3,179,634 wherein approximately equimolar amounts of a dianhydride and a diamine are dissolved together in a solvent and the resulting solution is agitated under controlled temperature conditions until polymerization of the dianhydride and the diamine is completed.

A few of the dianhydrides suitable for use in polyimide manufacture of the present invention include:
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
3,3',4,4'-benzophenone tetracarboxy dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride; and the like.

A few of the diamines suitable for use in polyimide manufacture of the present invention include: 4,4'-diaminodiphenyl propane; 4,4'-diamino diphenyl methane; benzidine, 3,3'-dichlorobenzidene; 4,4'-diamino diphenyl sulfide; 3,3'-diamino diphenyl sulfone; 4,4'-diamino diphenyl sulfone; 4,4'-diamino diphenyl ether; 1,5-diamino naphthalene; 4,4'-diamino diphenyl diethylsilane; 4,4'-diamino diphenyl diphenylsilane; 4,4'-diamino diphenyl ethyl phosphine oxide; 4,4'-diamino diphenyl N-methyl amine; 4,4'-diamino diphenyl N-phenyl amine; and the like.

The solvent used in the process of this invention must dissolve one or both of the polymerizing reactants and, preferably, will dissolve the polyamic acid polymerization product. The solvent must, of course, be substantially unreactive with all of the polymerizing reactants and with the polyamic acid polymerization product. It is also important that the solvent in practice of this invention be miscible with water in all proportions.

Solvents preferred for use in polyimide manufacture of the present invention include normally liquid N,N-dialkylcarboxylamides, generally. Preferred ones of those solvents include the lower molecular weight members of such carboxylamides, particularly N,N-dimethylformamide and N,N-diethylacetamide. Other useful compounds of this class of solvents are N,N-diethylformamide and N,N-diethylacetamide. Other solvents which may be used in the present invention are dimethylsulfoxide, N-methyl-2-pyrrolidone, tetramethyl urea, dimethylsulfone, hexamethylphosphoramide, tetramethylene sulfone, and the like. The solvents can be used alone or in combinations. The amount of solvent used is about 75 to 90 weight % of the polyamide acid and the conductive material. Preferably the amount of solvent used will be about 85% of the polyamide acid and the conductive material, since this concentration has been found to give optimum molecular weight.

Polyamic acid solutions are generally made by dissolving a diamine in a dry solvent and slowly adding a dianhydride under conditions of agitation and controlled temperature in an inert atmosphere. The diamine is conveniently present as a 5 to 15 weight percent solution in the solvent and the diamine and dianhydride are usually used in about equimolar amounts.

To prepare the electrically conductive polyimide articles of this invention, a finely-divided electrically conductive particulate material is incorporated in the polyamic acid solution. The conductive material may be added to the already formed polyamic acid solution or may be incorporated earlier as the polyamic solution is being formed. The conductive material should be uniformly dispersed throughout the polyamic acid solution by use of moderate to high shear mixing conditions, in order to give a uniform product.

The electrically conductive material used in this invention can be any material which has a conductivity adequate to exhibit a surface resistivity of about 10 to about $10^8$ ohms/square in a film about 25 microns thick with a particle concentration of about 18 weight percent in a polyimide matrix polymer, when prepared by the thermal conversion process. A conductive material providing surface resistivity under such conditions of about 10 to about 5000 ohms/square is preferred, and for most applications a material providing a surface resistivity of about 150 to about 1500 ohms/square is more preferred. The most preferred materials provide surface resistivity is about 500 ohms/square.

Suitable electrically conductive materials include carbon black in the form of lampblack, furnace black, channel black and graphite and conductive metals such as aluminum. Carbon blacks, especially furnace blacks, are preferred. The finely-divided particles generally have a particle size in the range of about 0.2 to 0.9 micrometers, preferably 0.3 to 0.4 micrometers. The amount of conductive material dispersed in the polyamic solution will generally be enough to provide about 10 to 45%, preferably about 15 to 25%, and most preferably about 18%, by weight, of the particles in the final blend of particles and polymer. Use of lesser amounts of conductive particles may result in insufficient conductivity of the film, while use of much greater amounts of conductive particles may result in deterioration of the physical properties of the film.

To form the casting dope, the polyamic acid solutions containing the electrically conductive material are usually treated by chilling them to about 10° C. to −10° C. and adding polyamic acid conversion chemicals. The polyamic acid conversion chemicals are tertiary amine catalysts and anhydride dehydrating materials. The preferred anhydride dehydrating material is acetic anhydride and is used in slight molar excess of the amount of amic acid groups in the polyamic acid, typically about 2-2.5 moles per equivalent of polyamic acid. A comparable amount of tertiary amine catalyst is used. Besides acetic anhydride, other operable lower fatty acid anhydrides include propionic, butyric, valeric, mixed anhydrides of these with one another and with anhydrides of aromatic monocarboxylic acids, for example, benzoic acid, naphthoic acid, and the like, and with anhydrides of carbonic and formic acids, as well as aliphatic ketenes (ketene and dimethyl ketene). Ketenes may be regarded as anhydrides of carboxylic acids derived from drastic dehydration of the acids.

The preferred tertiary amine catalysts are pyridine and beta-picoline and they are used in an amount of about one mole per mole of anhydride dehydrating material. Tertiary amines having approximately the same activity as the preferred pyridine and beta-picoline may be used in the process. These include 3,4-lutidine; 3,5-lutidine; 4-methyl pyridine; 4-isopropyl pyridine; N-dimethyl benzyl amine; isoquinoline; 4-benzyl pyridine, and N-dimethyl dodecyl amine. Trimethyl amine and triethyl amine are more active than those amines listed above and can be used in smaller amounts. Any tertiary amine which can remain in the gel after the heating and extraction steps will be useful to accelerate completion of the conversion of polyamic acid to polyimide by thermal means during drying of the extracted gel.

The polyamic acid conversion chemicals are important to practice of the present invention. They will react at about room temperature or above to convert polyamic acid to polyimide. The chemical conversion reaction occurs at temperatures from 10 to 120° C., with the reaction being very rapid at the higher temperatures and very slow at the lower temperatures. Below a certain temperature, polyamic acid chemical conversion comes to a practical halt. This temperature is generally about 10° C. It is important, therefore, that the polyamic acid solution be chilled below this temperature before adding the polyamic acid conversion chemicals and that the temperature of the solution, with conversion chemicals, be maintained below this temperature during extrusion or casting.

The treated, chilled, polyamic acid solution is cast or extruded onto a heated conversion surface whereupon some of the solvent is evaporated from the solution, the polyamic acid is partially chemically converted to polyimide, and the solution takes the form of a polyamic acid-polyimide gel. The solution, as it is cast or extruded, generally includes about 230 to 1900 weight parts solvent per 100 weight parts polyamic acid-polyimide and is maintained at about 10° to −10° C. The conversion surface, usually a polished metal drum, is kept at a temperature of about 60° to 120° C. and a flow of air is maintained over the drum to permit removal of evaporated solvent. The polyamic acid-polyimide gel which results from contact of the solution with the conversion surface contains about 100 to 1000 weight parts solvent per 100 weight parts polyamic acid- polyimide and is a nonreversible gel of precipitated polymeric material. Conversion of amic acid groups to imide groups depends on contact time and temperature but is usually about 25 to 95% complete. As a film or fiber or similar shaped structure of indefinite length, the gel is self-supporting in spite of its high solvent content.

To complete the manufacture of polyimide, the solvent must be removed from the shaped polyamic acid-polyimide gel and the remaining polyamic acid must be converted to polyimide. In order to accomplish this conversion, the shaped polyimide gel is introduced to an aqueous medium to remove most of the solvent from the gel by extraction. The aqueous medium can be mostly water and can be all water; but usually includes a small amount of the solvent which is to be extracted. For example, suitable aqueous media include aqueous dimethyl acetamide (DMAC) in concentrations of up to about 10%. The gel is immersed in the aqueous medium for a time sufficient to extract solvent from the gel until a concentration of solvent in the gel of about less than about 15, preferably about 10, weight parts per 100 weight parts polyamic acid-polyimide is obtained. The solvent which is removed during the extraction step is believed to be replaced by a comparable amount of water.

The extent of solvent extraction into the aqueous medium is a function of temperature, degree of agitation, and time. Furthermore, an aqueous medium having a low concentration of solvent will be more effective than an aqueous medium having a higher concentration of solvent. For an aqueous medium having about 5 weight percent of the solvent to be extracted and for a gel having a thickness of about 250 microns an immersion time of about 5 to 60 seconds has been found adequate. Bath temperatures of 0° to 100° C. have been found to be acceptable; temperatures of 40°-70° C. are preferred.

The solvent extraction can be preformed in a single bath of aqueous medium or in a sequence of baths. If a single bath is used, provision should be made to control the solvent concentration therein by recycling the aqueous medium, once used, with additional water, or by continuously adding water to the aqueous medium as the extraction is conducted. The bath must contain at most a minor proportion of solvent, by which is meant an amount sufficiently low to drive the extraction to the desired level of residual solvent in the film. Solvent extraction in a single bath preferably utilizes an aqueous medium containing 5 or less weight percent solvent.

In preferred operation of this invention, at least two baths of aqueous medium are used in sequence, and more can be used if desired. The first bath has a solvent concentration of 30 to 60 weight percent, the last bath has a solvent concentration of 0 to 15 weight percent, and intermediate baths have intermediate solvent concentrations. It is preferred that the bath into which the gel is placed initially contains about 30 to 60 weight percent of the solvent being removed from the gel, in order to prevent extraction of solvent from the surface of the gel at a rate which causes rapid surface densification of the gel and interferes with completion of the solvent removal. Extraction by means of a sequence of baths requires less time than extraction using only a single bath. When more than one bath is used, at least one of the baths must have an aqueous medium with a major proportion of water and a minor proportion, as defined above, of solvent for the polyamic acid. This bath will normally be the last bath encountered in the extraction process.

In the usual case the gel is a continuous length of film. The gel can be introduced to the baths by being drawn through them, being festooned over rollers and moved continuously through the aqueous medium. In such continuous operation, a series of tanks of the aqueous medium is preferred. One suitable arrangement is to employ a countercurrent flow of aqueous medium from the last tank progressively toward the first tank. Alternatively, each tank can be flooded with aqueous medium having the correct solvent concentration. Actual immersion of the film in the baths is not required. For example, the appropriate aqueous medium can be sprayed onto the film. Other means for contacting polyamic acid-polyimide gel with the aqueous medium may also be contemplated.

The tertiary amine catalysts and anhydride dehydrating materials, which are useful in the chemical conversion of polyamic acid to polyimide, are not considered to be a part of the solvent, despite the fact that such materials may be dissolved in, and form a part of, the liquid system. The tertiary amine useful in thermal conversion after the extraction, for example, beta-picoline, may remain in the polyamic acid-polyimide gel in amounts adequate to accelerate conversion to polyimide despite the immersion and solvent extraction operations of the process of this invention.

The gel, after it is removed from the aqueous medium, is about 25 weight percent solid polyamic acid-polyimide material. The gel must be dried to remove the water, residual solvent, and remaining conversion chemicals, and the polyamic acid must be completely converted to polyimide. The drying can be conducted at relatively mild conditions without complete conversion of polyamic acid to polyimide at that time, or the drying and conversion can be conducted at the same time using higher temperatures. Because the gel has so much liquid which must be removed during the drying and converting steps, the gel must be restrained during drying to avoid undesired shrinkage. In continuous production of a film by the process of this invention, the film can be held at the edges, such as in a tenter frame using tenter clips or pins for restraint. A polyimide film which is permitted to shrink excessively during drying and conversion is brittle and lacks the superior performance characteristics expected of polyimide film materials.

Preferred practice of this process involves use of high temperatures for short times to dry the film and convert it to polyimide in the same step. It is preferred to heat the film to a temperature of 200°-450° C. for 15 to 400 seconds. Of course, less heat and time are required for thin films than for thicker films. During this drying and converting, the film is restrained from undue shrinking and, in fact, can be stretched by as much as 40 percent of its initial dimension prior to completion of the drying and conversion. Stretching can be in any dimension. In film manufacture, stretching can be in either the longitudinal direction or the transverse direction. If desired the restraint can also be provided to permit some limited degree of shrinkage. Shrinkage of as much as 15 percent has been found to provide an adequate product.

The conductive polyimide articles made by the aforementioned process differ from corresponding articles made by processes described in the art in that the articles of this invention have a denser polymer matrix structure than do articles made by the chemical conversion process without solvent extraction, and a slightly less dense polymer matrix structure than articles made by the thermal conversion process. The specific density of the article will depend on a number of factors, such as the chemical identity of the matrix polymer and the amount of filler.

The density of the article is believed to be a function of the presence of microscopic voids present in the matrix resin. It is believed that the presence and relative amount of such voids play an important role in determining the extent of conductivity of the article. Polyimides prepared by chemical conversion (without extraction) have a relatively large number of microscopic voids, which are believed to separate particles of the conductive filler, thereby impeding the flow of electricity. While not being bound by any theory, it is believed that the denser matrix structure of the thermally converted material, due to the relative lack of microscopic voids, permits better contact between the conductive particles, resulting in bulk conductivity. The polymer of the present invention has an intermediate structure, so that there is a limited amount of contact between the conductive particles, resulting in the desired level of conductivity. It is believed that this intermediate density and intermediate number of voids comes about because of the water extraction process, in that the removal of the solvent in the water baths halts the gelation (imidization) process. By halting the gelation at a point less than 50% imidization, void content in the film is maintained at intermediate but relatively low levels. This level of voids permits some conductive paths to be formed between the particles of the conductive filler, resulting in the observed conductivity.

While some level of conductivity is sometimes measurable in films prepared by the chemical conversion process, as reported in Canadian Pat. No. 708,896, this conductivity is not generally reproducible. It is believed that films prepared by immersion of polyamic acid dispersion (cast on a glass plate) into a bath of conversion chemicals are less uniform than are films prepared by the preferred process of providing premixed conversion chemicals in the chilled dope. In the bath process, diffusion of conversion chemicals into the film occurs from one side only, and is believed to result films with subtle differences between the "glass side" and the "air side." It has been found that films prepared by the bath process occasionally exhibit some conductivity, when measured on the "glass side." However, this conductivity is not reproducible, and such films would not be commercially useful.

The level of microscopic voids in the matrix polyimide is believed to be important in the determination of conductivity. The level of such voids in articles of the present invention is such that the density of the matrix is from about 97% to about 99% of the density of the matrix of the same composition when prepared by a thermal conversion process. The density of the matrix can be readily determined by measuring the density of the filled article, and correcting for the density and volume fraction of the conductive particles, as described in more detail in the Examples section.

The surface conductivity of 25-64 micrometer (1-2.5 mil) films of the present invention is typically about $2.5 \times 10^3$ to about $5 \times 10^6$ ohm/square, although values even beyond these limits may be attainable. For comparisons among films of different thicknesses, volume resistivity is often a more meaningful measurement than surface resistivity. Volume resistivity, in ohm-cm, may be found by multiplying the measured surface resistivity by the film thickness, in cm. Thus typical values of surface resistivity for films of the present invention are about 8 to about 20,000 ohm-cm.

EXAMPLE 1

A carbon-loaded polyamic acid casting dope consisting of 20 parts by weight Monsanto lampblack B-5, 60 parts polyamic acid derived from pyromellitic dianhydride (PMDA) and 4,4'-oxydianiline (ODA) and 240 parts of dimethylacetamide (DMAc) is doctored onto three "Pyrex" glass plates. Plate 1 (thermal conversion process) is placed on a hotplate at 50° C. and the temperature is allowed to increase over a 20-minute interval to 135° C., followed by baking at that temperature for 25-30 minutes. The plate is removed from the hot plate and allowed to cool for 10-15 minutes at which time the coating is a self-supporting web that is peeled from the glass, clamped onto a frame and dried further for 30 minutes at 300° C. to complete solvent removal and imidization. Plate 2 (chemical conversion process) is not heated, but instead is placed in a 1:1 volume mixture of acetic anhydride and beta-picoline for a sufficient period of time (about 5-8 minutes) to form a self-supporting web which is peeled from the glass, clamped onto a frame and dried for 30 minutes at 300° C. Plate 3 (extraction process) is placed in a 1:1 volume mixture of acetic anhydride and beta-picoline to form a self-supporting film which is peeled from the glass, clamped onto a frame, and immersed in a mixture of 1 part by volume dimethylacetamide in 9 parts distilled water. After soaking for 10 minutes, the framed film, now containing about 12% by weight DMAc, is removed, allowed to drain and then heated and dried for 30 minutes at 300° C. The following properties of these three films are measured:

| Plate | Process | Film Thickness micrometers | Apparent Density g/cm³ | Matrix Density g/cm³ | Surface Resistivity ohms/square at 10 volts |
|---|---|---|---|---|---|
| 1 | Thermal | 28 | 1.51 | 1.451 | 599 |
| 2 | Chemical | 25 | 1.39 | 1.303 | >10⁸ |
| 3 | Water Extraction | 28 | 1.49 | 1.426 | 14,000 |

The apparent density of the films is determined by introducing a small specimen of the film into a column of partially mixed liquids of different dentities, having a vertial, nearly linear density gradient. Density is determined from the measurement of the height at which the specimen came to rest in the column, relative to glass beads of accurately known densities. A suitable pair of liquids for this measurement is carbon tetrachloride (d 20/4=1.595 g/mL) and n-hexane (d 20/4=0.684 g/mL). The matrix density is calculated from the apparent density by assuming a density of 1.7 for the carbon black, and using the fact that one equivalent of the polyamic acid, formula weight 418, upon conversion to the polyimide loses two units of water to give a formula weight of 382. For example:

```
  54.8 g polyimide (from 60 g polyamic acid)
+ 20.0 g carbon black (at 1.7 g/cm³ = 11.76 cm³)
  74.8 g total film (at 1.49 g/cm³ = 50.20 cm³)
  54.8 g polyimide / 38.44 cm³ matrix volxume =
        1.426 g/cm³ matrix density
```

Although differences in the actual density of the carbon black used, as well as other variables, may introduce some error into the absolute values of the calculated matrix densities, the relative values accurately show that the matrix density of the water extracted film is about 97-99 percent that of the thermally converted film, whereas the chemically converted film is only about 90 percent as dense.

EXAMPLE 2

Two casting dopes are prepared from the following compositions:

A. 20 parts by weight of "Conductex" 975 carbon black (Columbian Carbon Co.), 70 parts polyamic acid derived from PMDA and ODA (as in Example 1) and 460 parts DMAc;

B. 30 parts "Conductex" 975, 70 parts polyamic acid derived from PMDA and ODA and 550 parts of DMAc.

Films from A and B are prepared by the water extraction process of Example 1, plate 3. The properties of the final, cured films are:

| Film | Thickness, micrometers | Surface Resistivity, ohms/square at 10 volts |
| --- | --- | --- |
| A | 64 | 468,000 |
| B | 64 | 138,000 |

EXAMPLE 3

Films are prepared as in Example 2 except that "Ketjenblack" carbon black (Akzo Chemie America, Noury Chemicals Division) is used in place of "Conductex" 975. The casting dope compositions are:

A. 10 parts "Ketjenblack"
70 parts polyamic acid
470 parts DMAc
B. 15 parts "Ketjenblack"
70 parts polyamic acid
565 parts DMAc The following properties are measured:

| Film | Thickness, micrometers | Surface Resistivity, ohms/square at 10 volts |
| --- | --- | --- |
| A | 38 | $5 \times 10^6$ |
| B | 48 | $1 \times 10^6$ |

EXAMPLE 4

A casting dope consisting of 20 parts lampblackb-5, 20 parts aluminum powder, 80 parts polyamic acid, and 500 parts DMAc is prepared. Three films are prepared as in Example 1. The following properties are measured:

| Plate | Process | Thickness, micrometers | Surface Resistivity, ohms/square at 10 volts |
| --- | --- | --- | --- |
| 1 | Thermal | 33 | 670 |
| 2 | Chemical | 36 | $>10^8$ |
| 3 | Water Extraction | 33 | 2500 |

I claim:

1. A process for making a film having good high temperature performance and intermediate electrical conductivity comprising the steps of:
    (a) dispersing about 10 to about 45% by weight, based on the weight of the final film, of a finely-divided electrically conductive particulate material homogeneously throughout a casting dope, said casting dope comprising a polyamic acid and a solvent for the polyamic acid, said solvent being present in an amount of about 75 to about 90 weight percent of the combined polyamic acid and particulate material;
    (b) casting or extrudinq the dispersion formed in step (a) onto a smooth surface;
    (c) providing intimate contact of the dispersion on the smooth surface with polyamic acid conversion chemicals in sufficient quantity and at a sufficient temperature to partially convert the polyamic acid to polyimide, thereby forming a gel;
    (d) thereafter contacting the gel with an aqueous medium comprising a major proportion of water and a minor proportion of solvent for the polyamic acid; and
    (e) maintaining the contact of step (d) for a sufficient time and with a sufficient volume of aqueous medium to reduce the amount of solvent in the gel to less than 15 parts of solvent per 100 parts of polyamic acid-polyimide.

2. The process of claim 1, further comprising the steps of:
    (f) removing the polyamic acid-polyimide gel from contact with the aqeous medium; and
    (g) heating the gel under restraint to a sufficient temperature and for a sufficient time that substantially all of the polyamic acid is converted to polyimide.

3. The process of claim 2, wherein the polyamic acid conversion chemicals are added to the dope of step (a), the dispersion prepared in step (a) is maintained at a sufficiently low temperature that conversion of the polyamic acid to polyimide does not occur to any significant extent, and the smooth surface of step (b) is maintained at about 75° to about 100° C.

4. The process of claim 3 wherein the aqueous medium of (d) is at least about 90 weight percent water and at most about 10 weight percent solvent for the polyamic acid.

5. The process of claim 4 wherein the solvent for the polyamic acid in the aqueous medium is the same as the solvent for the polyamic acid in the dispersion of (a).

6. The process of claim 5 wherein the contact of step (d) is maintained to reduce the solvent in the gel to less than about 15 but more than about 10 parts of solvent per 100 parts of polyamic acid-polyimide.

* * * * *